United States Patent
Olivier et al.

(10) Patent No.: US 9,535,532 B2
(45) Date of Patent: Jan. 3, 2017

(54) METHOD OF ACQUIRING DATA FROM A MATRIX TOUCH SENSOR BY PERFORMING GLOBAL MEASUREMENT AND CONDITIONAL SEQUENTIAL MEASUREMENT

(71) Applicant: NISSHA PRINTING CO., LTD., Bordeaux (FR)

(72) Inventors: Julien Olivier, Bordeaux (FR); Pascal Joguet, Sadirac (FR); Guillaume Largillier, Bordeaux (FR)

(73) Assignee: NISSHA PRINTING CO., LTD., Kyoto-shi (JP)

( * ) Notice: Subject to any disclaimer, the term of this patent is extended or adjusted under 35 U.S.C. 154(b) by 103 days.

(21) Appl. No.: 14/352,587

(22) PCT Filed: Oct. 10, 2012

(86) PCT No.: PCT/FR2012/052298
§ 371 (c)(1),
(2) Date: Apr. 17, 2014

(87) PCT Pub. No.: WO2013/057412
PCT Pub. Date: Apr. 25, 2013

(65) Prior Publication Data
US 2014/0247236 A1    Sep. 4, 2014

(30) Foreign Application Priority Data

Oct. 20, 2011    (FR) ...................................... 11 59502

(51) Int. Cl.
*G06F 1/32*      (2006.01)
*G06F 3/044*      (2006.01)
(Continued)

(52) U.S. Cl.
CPC ............ *G06F 3/0416* (2013.01); *G06F 1/3262* (2013.01); *G06F 3/044* (2013.01); *G06F 3/045* (2013.01)

(58) Field of Classification Search
CPC ........ G06F 3/0416; G06F 3/044; G06F 3/045; G06F 1/3262
See application file for complete search history.

(56) References Cited

U.S. PATENT DOCUMENTS 6,762,752 B2    7/2004   Perski et al.
2007/0152976 A1*   7/2007   Townsend ............. G06F 3/0416
                                                 345/173
(Continued)

FOREIGN PATENT DOCUMENTS

EP         1 719 047      11/2006
WO     2010 015750    2/2010

OTHER PUBLICATIONS

International Search Report Issued Jan. 30, 2013 in PCT/FR12/052298 Filed Oct. 10, 2012.

*Primary Examiner* — Ryan A Lubit
(74) *Attorney, Agent, or Firm* — Oblon, McClelland, Maier & Neustadt, L.L.P.

(57) ABSTRACT

A method of acquiring data of a matrix touch sensor including a matrix array of cells arranged according to a set of rows and columns, the method including: activating the cells arranged according to a column of at least one subset of columns of the matrix touch sensor; taking an overall measurement of an overall electrical characteristic on all the rows of at least one subset of rows of the matrix touch sensor; taking a sequential measurement of an electrical characteristic successively on each row of the at least one subset of rows, if the overall electrical characteristic has a value representative of a contact on at least one of the cells arranged according to the column; and repeating the overall (Continued)

measurement and sequential measurement after activating the cells arranged according to another column of the at least one subset of columns of the matrix touch sensor.

14 Claims, 6 Drawing Sheets

(51) Int. Cl.
*G06F 3/045* (2006.01)
*G06F 3/041* (2006.01)

(56) References Cited

U.S. PATENT DOCUMENTS

| | | |
|---|---|---|
| 2008/0277171 A1 | 11/2008 | Wright |
| 2009/0146971 A1* | 6/2009 | Noda .................... G06F 3/0416 345/175 |
| 2011/0025629 A1* | 2/2011 | Grivna .................. G06F 3/0416 345/173 |
| 2011/0134067 A1 | 6/2011 | Joguet et al. |
| 2011/0193798 A1 | 8/2011 | Zhan et al. |
| 2012/0007586 A1* | 1/2012 | Amrutur ................. G06F 3/016 324/114 |

* cited by examiner

METHOD OF ACQUIRING DATA FROM A MATRIX TOUCH SENSOR BY PERFORMING GLOBAL MEASUREMENT AND CONDITIONAL SEQUENTIAL MEASUREMENT

CROSS-REFERENCE TO RELATED APPLICATIONS

This application is a National Stage Entry of PCT/FR2012/052298, filed Oct. 10, 2012, which claims priority to French Application No. 1159502, filed Oct. 20, 2011, the entire contents of which are incorporated herein by reference.

FIELD

The present invention concerns a method for acquiring data from a matrix touch sensor.

It also concerns a matrix touch sensor and a touch screen which are adapted to implement that method of acquiring data.

In general terms, the present invention concerns the acquisition of data representing one or more contacts or points of pressing applied to the surface of the matrix touch sensor.

It finds its application in particular in multi-contact matrix touch sensors adapted to detect several zones of contact or pressing simultaneously on the surface of the matrix touch sensor.

Conventionally, such a matrix touch sensor comprises a matrix network of cells disposed in a set of rows and columns.

In its broadest application, the invention concerns any type of matrix touch sensor, for example a matrix of cells of TFT (Thin Film Transistor) type, of photodiode type, or more generally of optical type, piezoelectric type, magnetic type, or of thermal type (CCD or Charge-Coupled Device sensors).

BACKGROUND

Such a matrix touch sensor is known from document EP 1 719 047, constituted by a matrix network of conductive tracks disposed in rows and columns, the cells thus being defined at the location of each intersection of the rows and columns of the matrix network.

In document EP 1 719 047, the acquisition of data is carried out by sequentially scanning each cell of the matrix network, that is to say by successively powering each column of the matrix network and by successively measuring, for each powered column, an electrical characteristic at the terminals of each row, representing a level of impedance of the cell placed at the intersection of the row and of the column considered.

This sequential scanning of the cells makes it possible to simultaneously detect several points of contact on the matrix touch sensor at each scanning phase.

However, it is necessary to perform a high number of measurements at each sequential scanning phase in order to scan all the cells.

Thus, for a matrix network of cells constituted by N columns and M rows, the scanning of the sensor requires N×M measurements at each scanning phase.

Document U.S. Pat. No. 6,762,752 proposes an accelerated scanning method. In this document, in a first step, a set of columns is simultaneously powered and a sequential measurement is made for each row of a set of rows.

Next, in a second step, a set of rows is simultaneously powered and a sequential measurement is made for each column of a set of columns.

When several cells disposed on the same row and/or the same column are activated, the method identifies zones of ambiguity on which is implemented sequential conventional scanning as described above in relation to document EP 1 719 047.

Although faster, this method, alternating the axes of power supply and measurement of the cell matrix network, has the drawback of requiring connections that are reconfigurable at the inputs and outputs of the electronic measuring circuit.

The design of the data acquisition device is thus complex.

SUMMARY

There is provided a method of acquiring data from a matrix touch sensor including a matrix network of cells disposed in a set of rows and columns, the method comprising: activating the cells disposed in a column of at least one subset of columns of the matrix touch sensor; performing global measurement of a global electrical characteristic over all the rows of at least one subset of rows in only the column of the matrix touch sensor without performing the global measurement of the global electrical characteristic with respect to other column of the matrix touch sensor other than the column; performing, using processing circuitry, sequential measurement, only when the global electrical characteristic has a value representing a contact over at least one of the cells disposed in the column, of an electrical characteristic successively over each row of the at least one subset of rows in only the column where the global measurement is performed without performing sequential measurement of an electrical characteristic successively over each column; and only when the global electrical characteristic has no value representing a contact over at least one any of the cells disposed in the column, without performing the sequential measurement for the rows in the column where the global measurement is performed, reiterating the performing global measurement and the performing sequential measurement after activating the cells disposed in another column of at least one subset of columns of the matrix touch sensor.

DETAILED DESCRIPTION

Figure 1:
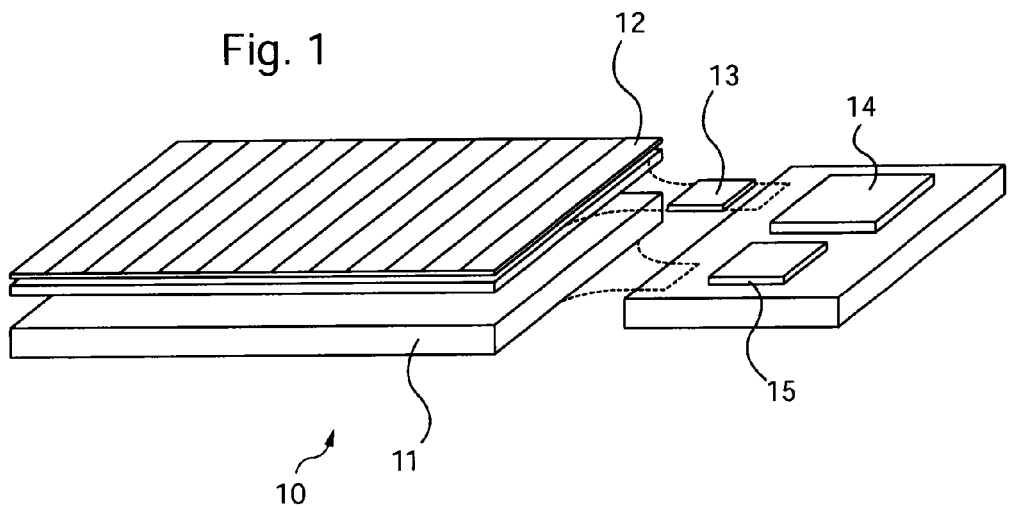
FIG. 1 is a diagrammatic view illustrating a touch screen in accordance with an embodiment of the invention.

An object of the present invention is to overcome at least one of the aforesaid drawbacks and to provide a method of acquiring data enabling the scanning to be accelerated without increasing the complexity of manufacture of a matrix touch sensor or of the electronic measuring circuit.

To that end, the present invention concerns a method of acquiring data from a matrix touch sensor comprising a matrix network of cells disposed in a set of rows and columns.

According to the invention, the method of acquiring data comprises the following steps:

activating the cells disposed in a column of at least one subset of columns of the matrix touch sensor;

performing global measurement of a global electrical characteristic over all the rows of at least one subset of rows of said matrix touch sensor;

performing sequential measurement, if said global electrical characteristic has a value representing a contact over at least one of said cells disposed in said column, of an electrical characteristic successively over each row of said at least one subset of rows; and reiterating said steps of performing global measurement and sequential measurement after activating the cells disposed in another column of at least one subset of columns of the matrix touch sensor.

Thus, this method makes it possible to optimize the electricity consumption and to reduce the time of scanning at each scanning phase of the whole of the sensor. To be precise, by adding a step of global measurement for each activated column, the sequential measurement in relation to the rows is carried out only if a contact is detected over at least one of the cells of the activated column.

According to an advantageous feature of the invention, the acquiring method comprises a data acquisition standby mode if, after activation of the cells of all the columns of said at least one subset of columns, no global electrical characteristic measured has a value representing a contact, this data acquisition standby mode comprising the following steps:

activating the cells disposed in all the columns of at least one subset of columns of the matrix touch sensor; and performing global measurement of a global electrical characteristic over all the rows of said at least one subset of rows of said matrix touch sensor.

Implementing a standby mode enables still further energy savings to be made, when no contact is present on the matrix touch sensor.

This is because the measuring means are only actuated to make a global measurement and no longer on the basis of scanning rows, which limits the consumption of electrical energy at a control microprocessor.

According to a practical embodiment of the invention, the electrical characteristic measured is a voltage, the global electrical characteristic being measured at the terminals of the rows of said at least one subset of rows connected in parallel.

Advantageously, said acquiring method is implemented on a subset of columns and a subset of rows of said matrix touch sensor corresponding to a zone of interest of the touch surface of the matrix sensor.

Advantageously, the matrix touch sensor being juxtaposed in relation to a display screen, the zone of interest corresponds to a zone for displaying a virtual graphical object on said juxtaposed display screen.

Thus, it is not necessary to scan the entirety of the matrix touch sensor since certain zones are of no interest and are inactive in relation to the detection of a touch or pressing point.

By thus targeting the scanning carried out on the zone or zones of interest of the touch sensor, the detection of data corresponding to pressing points is further accelerated.

According to a second aspect, the present invention concerns a matrix touch sensor comprising a cell matrix network disposed on a set of rows and columns.

According to the invention, this matrix touch sensor comprises a sensor interface and a microprocessor which are adapted to implement the method of acquiring data in accordance with the invention.

In practice, the rows of at least one subset of rows of the matrix touch sensor are connected via a multiplexer to means for measuring an electrical characteristic.

Thanks to this mounting via the multiplexer, it is possible to measure a global electrical characteristic at the location of several rows of the subset of rows, or on the contrary sequentially row after row.

Lastly, the present invention also concerns a touch screen comprising a display screen and a matrix touch sensor in accordance with the invention, the display screen and the matrix touch sensor being juxtaposed.

This matrix touch sensor and the touch screen have similar features and advantages to those described above in relation with the acquiring method in accordance with the invention.

Still other particularities and advantages of the invention will appear in the following description.

A description will first of all be made with reference to FIG. 1 of a touch screen according to an embodiment of the invention.

Such a touch screen is in particular described according to a specific embodiment in document EP 1 719 047 to which reference may advantageously be made for the details of implementation with no direct link with the present invention.

In its principle, the touch screen 10 comprises a display screen 11 and a matrix touch sensor 12 which are juxtaposed.

In the example embodiment illustrated in FIG. 1, the matrix touch sensor 12 is transparent and disposed above the display screen 11.

Of course, the present invention is not limited to this type of implementation.

In particular, a flexible screen may also be disposed above the matrix touch sensor which may then be opaque or transparent.

The touch screen 10 also comprises a capture interface 13, a main microprocessor 14 and a graphics processor 15.

The capture interface 13 constitutes measuring means making it possible in particular to acquire data measured at the multi-contact touch sensor 12.

This capture interface 13 contains the acquisition and analysis circuits required for the acquisition of the data, which may then be sent to the main processor 14 for processing, then for the implementation of the various functions of the touch screen 10.

Figure 2:
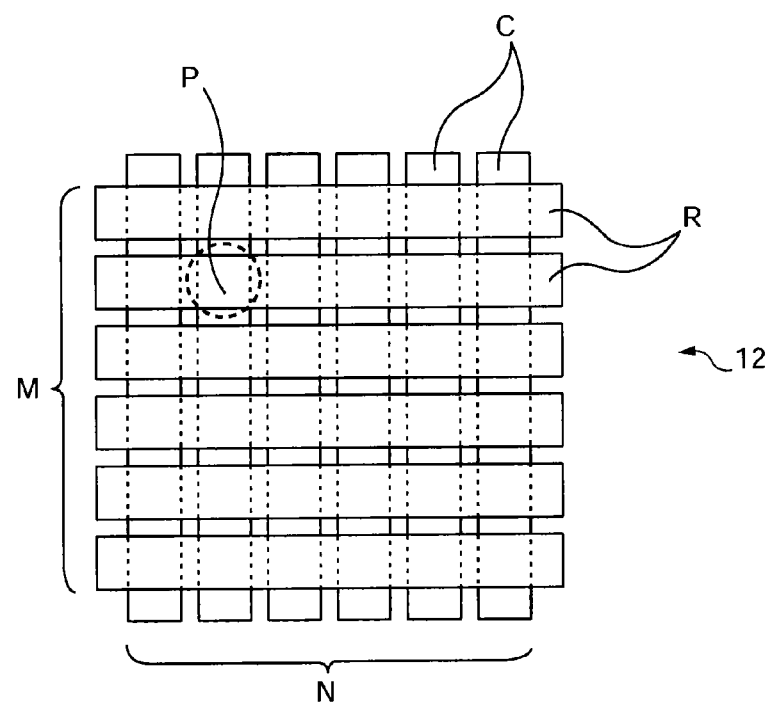
FIG. 2 is a diagrammatic view illustrating a matrix touch sensor in accordance with an embodiment of the invention.

An example embodiment of a matrix touch sensor is illustrated in FIG. 2.

In its principle, this matrix touch sensor 12 comprises a cell matrix network of cells P disposed in a set of rows R and columns C.

In the following part of the description, and in a way that is in no way limiting, a matrix touch sensor will be considered which is constituted by a matrix network of conductive tracks, the cells P being defined at the intersection of the conductive tracks disposed in rows R and columns C.

In the following part of the description, it will be considered that the matrix touch sensor comprises M rows R and N columns C.

The network of conductive tracks is for example produced from a conductive material, which is preferably translucent, for example by means of transparent metal oxides such as ITO (Indium Tin Oxide), nano-particle based solutions or conductive micro wires.

A network of lower conductive tracks, for example the rows R, may be positioned on a layer of glass and a network of upper conductive tracks, for example the columns C, may be positioned under a layer of polyethylene terephthalate (PET).

The acquisition of data is then carried out on the basis of the measurement of an electrical characteristic at the location of each cell P, representing a level of impedance of each cell P.

In particular, the matrix touch sensor may be of resistive or capacitive type.

In the case of a resistive type matrix touch sensor, a layer of air or a pressure sensitive layer separates the two networks of conductive tracks such that the rows R and columns C are not in electrical contact.

When a press is made on the outside surface of the matrix touch sensor 12, the impedance at the location of each cell P corresponding to that press is modified.

To be precise, when a touch or press is made on the outside surface of the matrix touch sensor 12, the conductive tracks of the rows R and of the columns C are placed in contact at the location of one or more cells P of the matrix network, such that a contact resistance is created at the location of those cells P and may be detected as explained later.

Of course, the matrix touch sensor 12 may also be a sensor of projected capacitive type: the position of a finger opposite a cell P placed at the intersection of a row R and of a column C modifies the capacitance at that intersection, which may also be detected as described later.

It will of course be noted that in the whole of the following description, the concept of columns C and of rows P is fully interchangeable.

In general terms, in order to perform the detection of a variation of impedance level at the cells P, each column C may be activated, that is to say connected to a source of electrical power and a measurement is made on one or more rows R by reading a voltage at the terminals of the electrical circuit so constituted.

As will become apparent later in the description of the acquiring method implemented in this matrix touch sensor, the rows of at least part of the sensor, and preferably all the rows of the matrix touch sensor 12, are connected via a multiplexer to the means for measuring and processing an electrical characteristic.

This multiplexer enables simple connection or disconnection of the rows to the electrical circuit so as to measure, separately or global, the voltage at the terminals of the rows R.

Figure 3:
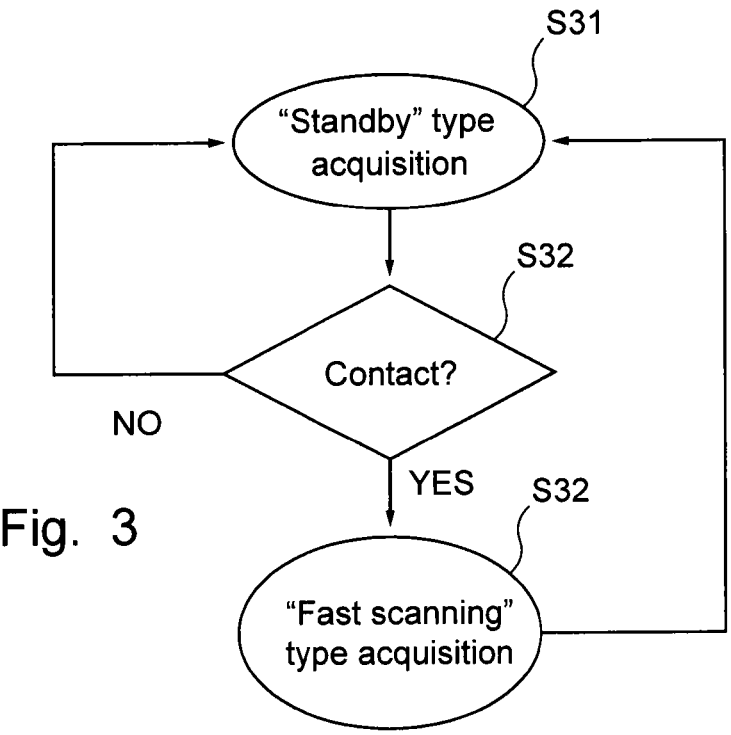
FIG. 3 is an algorithm of a global method of data acquisition according to an embodiment of the invention.

With reference to FIG. 3 and the following Figures, a description will now be given of a method of acquiring data implemented on a matrix touch sensor as described above.

It should be noted in what follows that the acquisition of data at the matrix touch sensor corresponds to detecting the activation of one or other cell P of the matrix touch sensor 12.

When such a cell P is considered as activated on scanning the matrix touch sensor, the coordinates of that cell P, as well as its impedance level, are stored at the processing means of the matrix touch sensor 12.

Later, on the basis of the different points of contact so detected at each activated cell P, it is possible by filtering the acquired data, determining encompassing zones, and detecting a barycenter associated with each encompassing zone, to determine one or more zones of pressing or touching corresponding to a contact zone on the surface of the touch sensor.

All these later operations of processing the data acquired at the matrix touch sensor 12 are in particular described in document EP 1 719 047 and have no need of being detailed again here.

As illustrated in FIG. 3, a method of acquiring data in accordance with a preferred embodiment of the invention comprises a data acquisition standby mode S31.

This data acquisition standby mode S31 will be described later with reference to FIG. 4.

It is implemented for as long as no contact is detected on the matrix touch sensor 12.

If at the end of a test step S32, a contact has been identified on the matrix touch sensor, the detection of data in standby mode is suspended and an acquisition mode of "fast scanning" type S32 is then implemented.

It should be noted that the use of a standby mode makes it possible to limit the electricity consumption of the matrix touch sensor 12 in the absence of any contact thereon.

Of course, the mode of acquiring data by "fast scanning" type, as will be described later with reference to FIGS. 5 and 6, may be implemented without necessarily being coupled to a data acquisition standby mode.

In the following part of the description it will be considered by way of non-limiting example that the method of acquiring data is implemented on all the columns C, which are N in number, and on all the rows R, which are M in number, of the matrix touch sensor 12.

Figure 4:
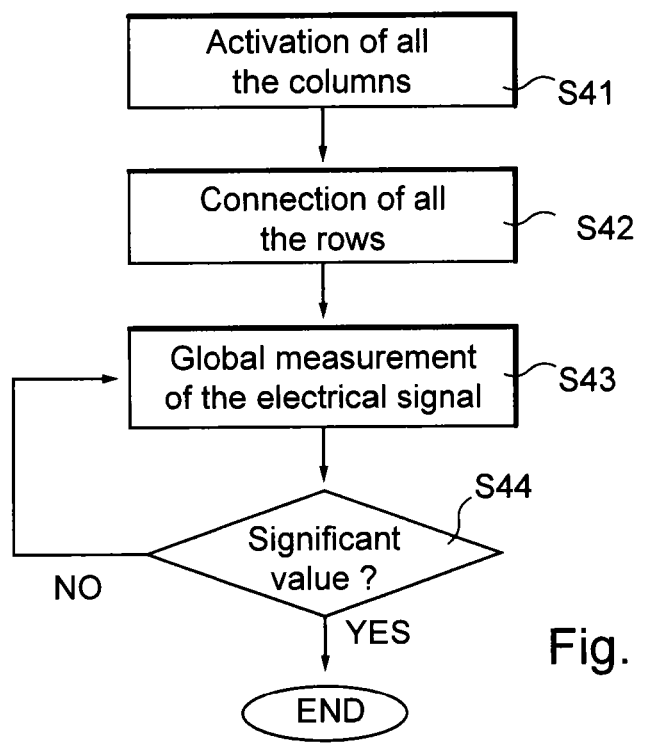
FIG. 4 is an algorithm illustrating a data acquisition standby mode.

A description will first of all be given with reference to FIG. 4 of the data acquisition mode implementing a standby mode on the matrix touch sensor.

The activation step S41 corresponds for example to the starting up of the apparatus or the launching of a software application.

The activation step S41 is implemented in relation to all the columns C of the matrix touch sensor.

Thus, all the cells P disposed on all the columns C of the matrix touch sensor are activated, that is to say powered with electric current.

Figure 7A:
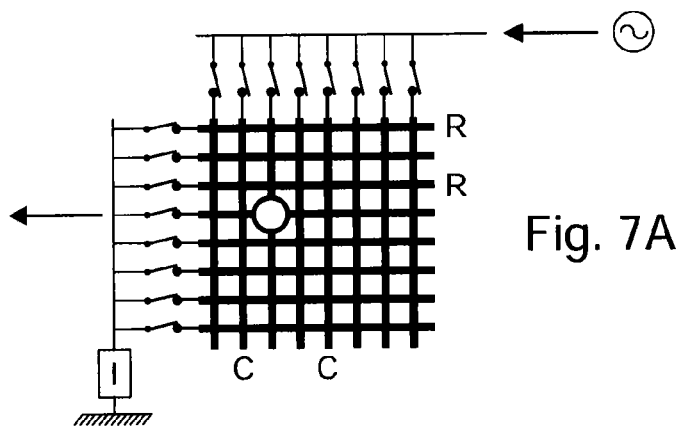
FIGS. 7A to 7E are diagrams illustrating an example of implementation of the method of acquiring data on a matrix touch sensor on detecting a point of contact.

This activation step S41 is in particular illustrated in FIG. 7A in which all the columns C are connected to the electrical supply.

By way of example, this electrical supply may be a 5 Volt source of electrical voltage.

A connection step S42 is next carried out in order to connect all the rows R to the means for measuring an electrical characteristic.

As indicated earlier, and illustrated in FIG. 7A, the connection of the rows R may be made via a multiplexer.

A global measuring step S43 is next carried out in relation to the rows R in order to measure a global electrical characteristic on all the rows of the matrix touch sensor.

In the example embodiment implementing a matrix touch sensor constituted by conductive tracks, the global electrical characteristic represents a voltage measured at the terminals of all the rows R connected in parallel.

This situation is also illustrated in FIG. 7A, in which all the rows R are connected in parallel to a common impedance such as a resistance, to enable the global measurement of the electrical characteristic.

A test step S44 is next carried out in order to verify whether the global electrical characteristic measured, for example the voltage measured at the terminals of the rows R of the matrix touch sensor, has a value representing a contact.

This value representing a contact corresponds to a predetermined significant value, calibrated at the time of manufacture of the matrix touch sensor.

In the negative, the global measuring step S43 is reiterated with a predefined periodicity.

It should be noted that this standby mode does not implement any scanning, which limits the energy consumption at the means 13, 14 for measuring and processing the signals associated with the matrix touch sensor.

The periodicity of measurement implemented to reiterate the global measuring step S43 in the absence of any contact may be adjusted in order to further reduce that electrical energy consumption, and in particular, depends on the context of use of the matrix touch sensor.

On the other hand, if at the end of the test step S44, the measured global electrical characteristic has a value representing a contact, the standby mode is suspended.

In this case, as illustrated in FIG. 3, the method of acquiring data switches to an acquisition mode of "fast scanning" type as will be described below at references 5 and 6.

It should be noted that the scanning mode described above only enables detection of whether or not a contact is present on the matrix touch sensor, without enabling location of that contact in relation to the activated cells P.

Figure 5:
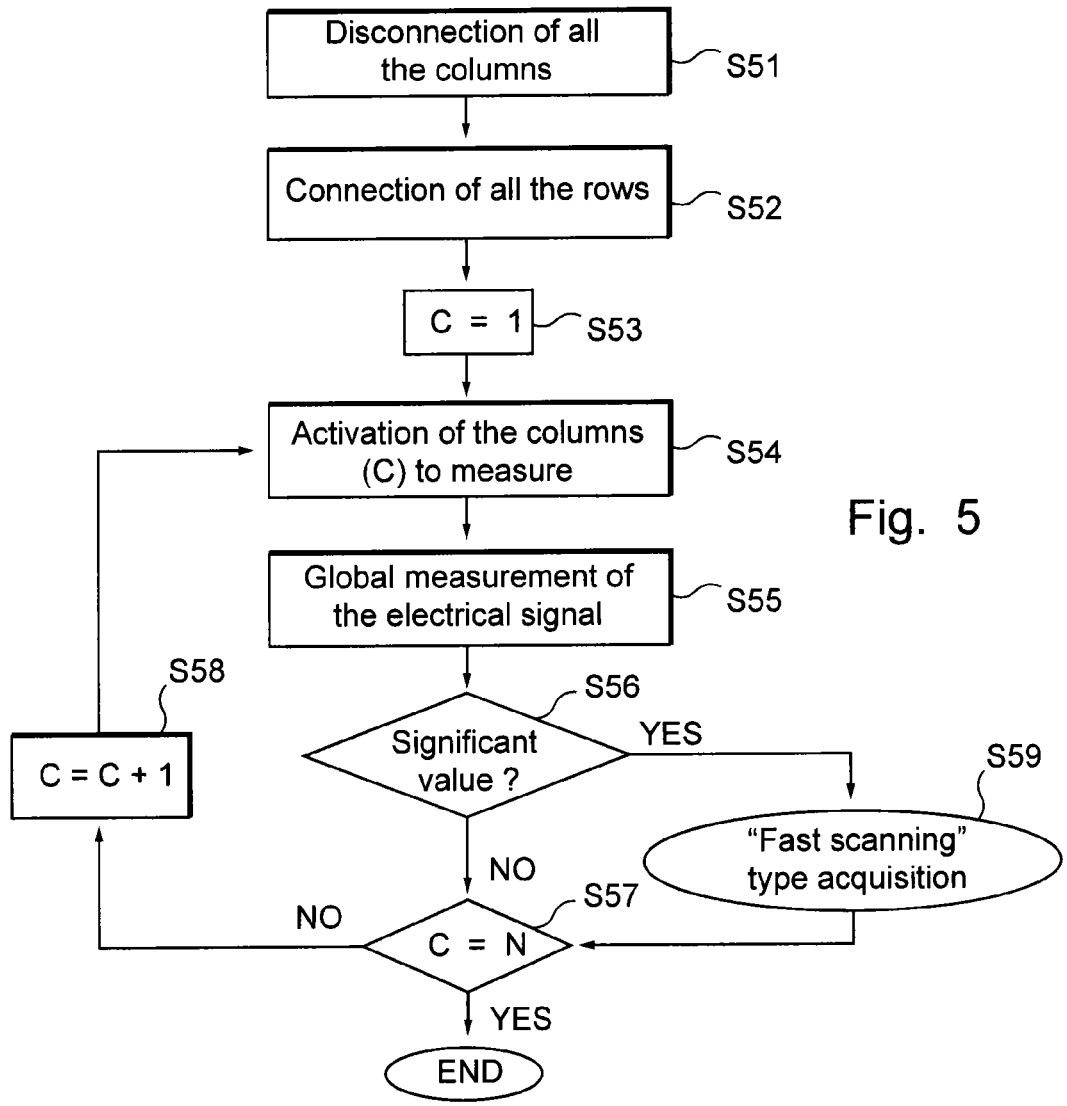
FIG. 5 is an algorithm illustrating the data acquisition mode implementing fast scanning according to an embodiment of the invention.

With reference to FIG. 5, a description will now be given of the "fast scanning" type acquisition mode.

This "fast scanning" type acquisition mode first of all comprises a step S51 of disconnecting all the columns.

A step S52 of connecting the rows R is next carried out as described above, by connecting all the rows via the multiplexer to the means for measuring an electrical characteristic at the terminals of those rows R.

Figure 7B:
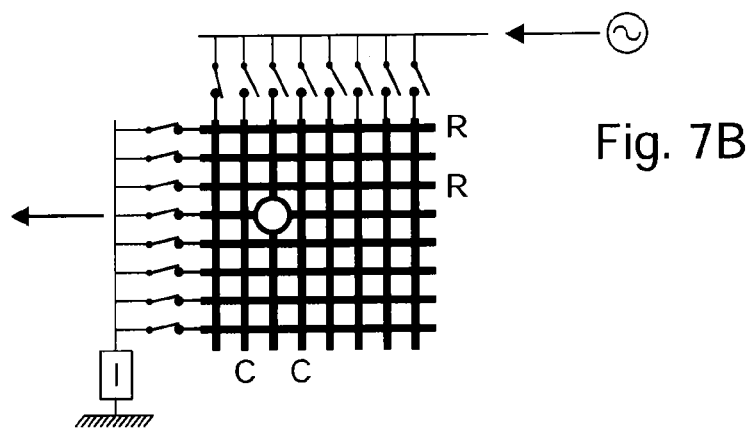

This situation is illustrated in particular in FIG. 7B.

Next, the acquiring method comprises a step S53 of initializing the columns to scan.

In practice, the first column C of index 1 is considered.

An activating step S54 is next implemented in order to activate the cells P disposed on the column to measure C.

This situation is also illustrated in FIG. 7B, in which only the first column is supplied with current, the other columns of the matrix touch sensor being short-circuited.

A global measuring step S55 is next carried out in order to measure a global electrical characteristic over all the rows R of the matrix touch sensor.

A test step S56 is then carried out in order to determine whether the global electrical characteristic measured has a value representing a contact on at least one of the cells P disposed on the column C to measure.

As illustrated in FIG. 7B, with no cell being activated on the first column, at the end of the test step S56, it is considered that that global electrical characteristic measured does not have a significant value, representing at least one contact on the column considered.

In a test step S57 it is checked whether the column C to measure corresponds to the last column of index N of the matrix touch sensor.

In the negative, the column index is incremented in an incrementing step S58 and the activating step S54 and global measuring step S55 are reiterated for the next column.

Figure 7C:
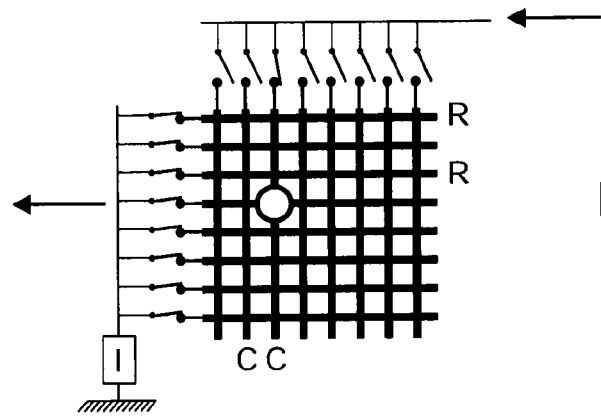

On the other hand, in the example illustrated in FIG. 7C, for the column of index C=3, the global electrical characteristic is considered as having a significant value at the end of the test step S56.

In this case, a "fast scanning" type acquisition mode S59 is implemented for that column C to measure.

It is to be noted indeed, that at the end of the test step S56, and as illustrated in FIG. 7C the "fast scanning" type acquisition mode enables detection of the presence of a point of contact on a measured column C but does not enable its coordinates to be identified on a specific row R.

Figure 6:
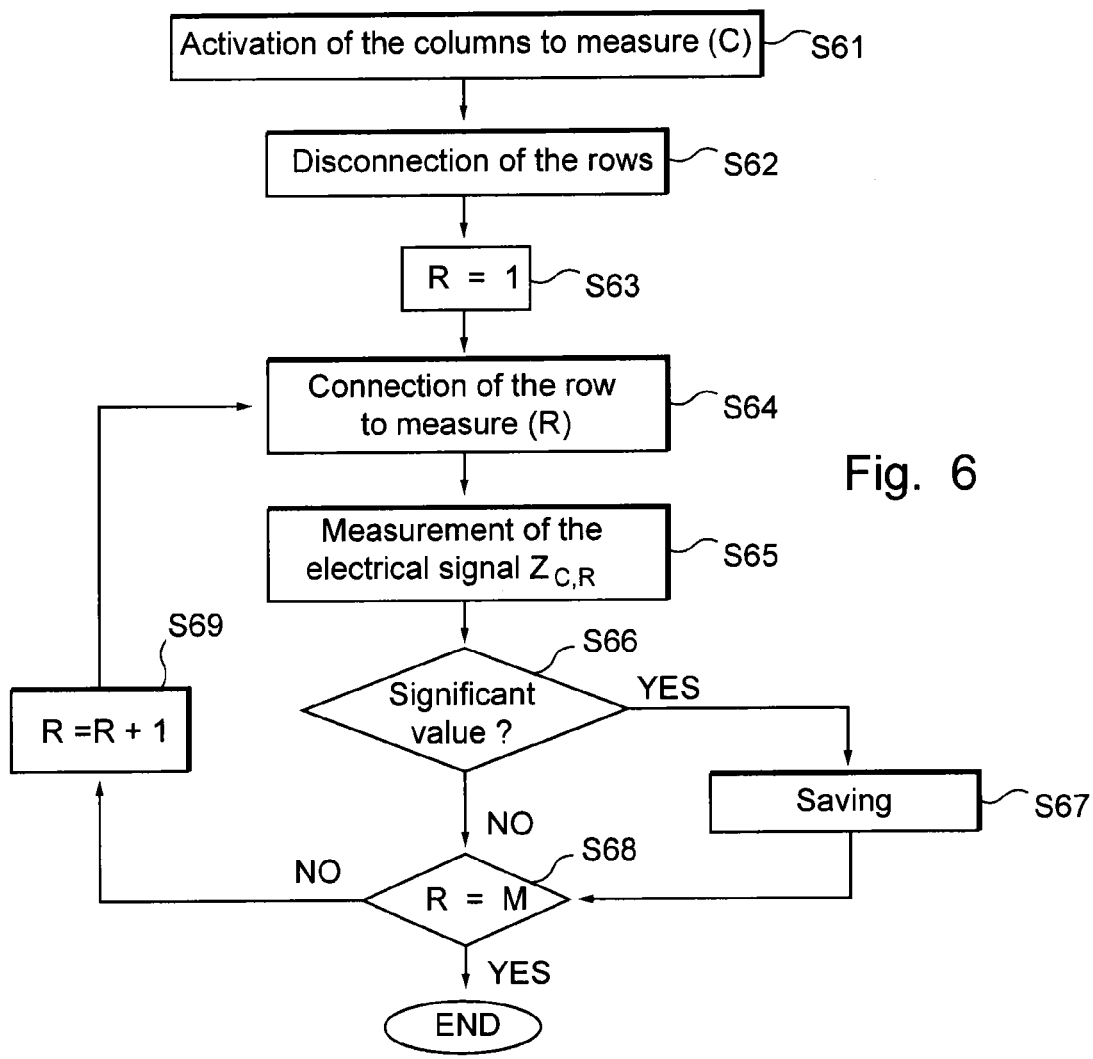
FIG. 6 is an algorithm detailing the acquisition mode with full scanning implemented in FIG. 5.

Thus, as illustrated in FIG. 6, a "fast scanning" type acquisition mode is implemented for the measured column C.

Thus, a step S61 of activating the column to measure C is carried out.

Figure 7D:
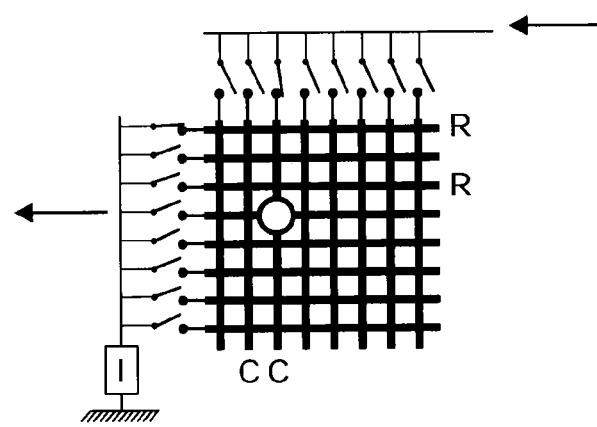

In practice, at the end of the test step S56, the activation of the column to measure C, initialized at the activation step S54, is continued as illustrated in FIG. 7D.

All the rows R are next disconnected from the multiplexer in a disconnecting step S62, then a first row R of index 1 is considered in an initializing step S63.

A connecting step S64 is next adapted to connect the first row of index 1 to the measuring means, the other rows R of the matrix touch sensor being in open circuit.

This situation is illustrated in FIG. 7D.

A sequential measuring step S65 is next carried out to measure an electrical characteristic on the row R to measure.

In the example embodiment described here, this electrical characteristic represents a level of impedance $Z_{C,R}$ for the cell P, at the intersection of the column C and of the row R.

A test step S66 makes it possible to verify whether the electrical characteristic measured at the measuring step S65, has a significant value, representing the presence of a contact at the cell P considered.

In the affirmative, a recording step S67 enables storage of the location of the activated cell, that is to say its coordinates in the matrix touch sensor as well as the value of the measured electrical characteristic.

Figure 7E:
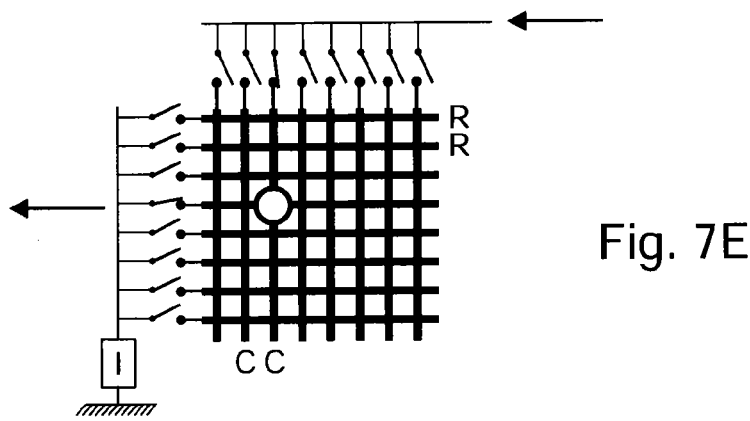

This situation is in particular illustrated in FIG. 7E, in which the activated cell corresponds to the intersection of the column of index C=3 and of the row of index R=4.

Next, in a test step S68 it is considered whether the measured row R corresponds to the last scanning index M.

In the negative, the index R is incremented in an incrementing step S69 and step S64 and the steps following it are reiterated on the next row.

If, at the end of the test step S66, the measured electrical characteristic does not have a significant value representing a contact, no data is recorded and the test step S68 is reiterated to scan all the rows R of the matrix touch sensor.

When at the end of test step S68, all the rows R of the matrix touch sensor have been sequentially scanned, the "fast scanning" type acquisition mode is terminated.

Returning to step 5, at the end of that "fast scanning" type acquisition mode, the test step S57 described earlier is reiterated in order to verify whether all the columns C have been scanned in the "fast scanning" type acquisition mode.

In the negative, the index incrementing step S58 is carried out in order to consider the following column and step S54 and the steps following it are reiterated.

When all the columns C of the matrix touch sensor have been considered at the end of the test step S57, the "fast scanning" type acquisition mode is terminated.

All the processes may then be carried out again on the matrix touch sensor in order to detect the points of contact on the matrix touch sensor.

The periodicity of the detection process depends on the context of use of the matrix touch sensor.

If at the end of the "fast scanning" type acquisition mode illustrated in FIGS. 5 and 6, no measured global electrical characteristic has a value signifying a contact, the method of acquiring data may again implement the standby mode.

This return to standby mode may be carried out as of no contact having been identified in a scanning phase of the matrix touch sensor 12, or after a predetermined latency time, in order to avoid switching to standby mode too quickly during use of the matrix touch sensor.

Thus, the scanning speed of the matrix touch sensor is accelerated relative to the embodiment in which only an acquisition mode of full scanning type is implemented.

Thus, whereas a full scan of the matrix touch sensor requires N×M measurements to detect the different activated cells P of a matrix touch sensor having N columns and M rows, the acquiring method implementing the "fast scanning" type acquisition mode coupled to the "full scanning" type acquisition mode, requires N×(1+a×M) measurements, in which a is the percentage of the columns touched on the sensor.

Through experience, on conventional use of a multi-touch touch sensor, and simultaneous use of two fingers, approximately 20% of the columns are touched, i.e. a total number of N×(1+0.2×M) required measurements in this example embodiment.

In the example embodiment described above, the implementation of the method of acquiring data over all the rows and columns C of the matrix touch sensor has been illustrated.

This type of implementation is particularly well-adapted when touches or zones of pressing on the matrix touch sensor can be situated at any location on the touch zone of the sensor during its use.

Figure 8A:
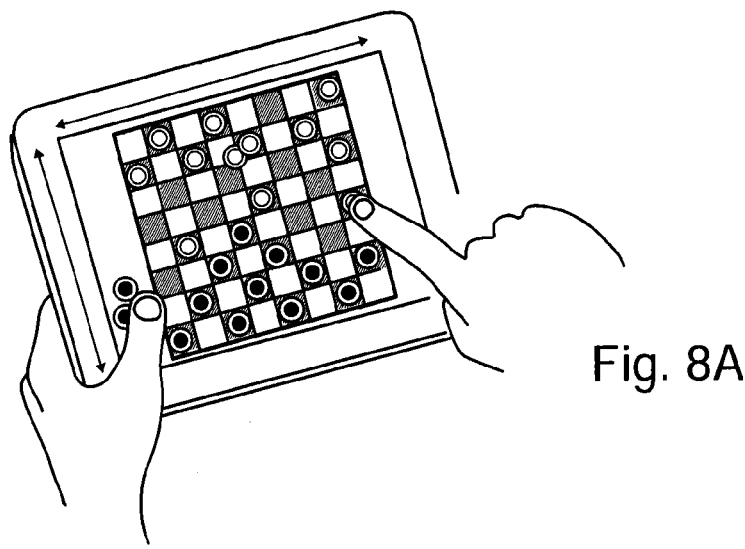
FIGS. 8A and 8B are examples of application of the method of acquiring data implemented on a touch screen in accordance with an embodiment of the invention.

Such an application is illustrated in particular in FIG. 8A, illustrating a checkerboard on which the user may be induced to touch different squares disposed at any location on the surface of a touch sensor.

Figure 8B:
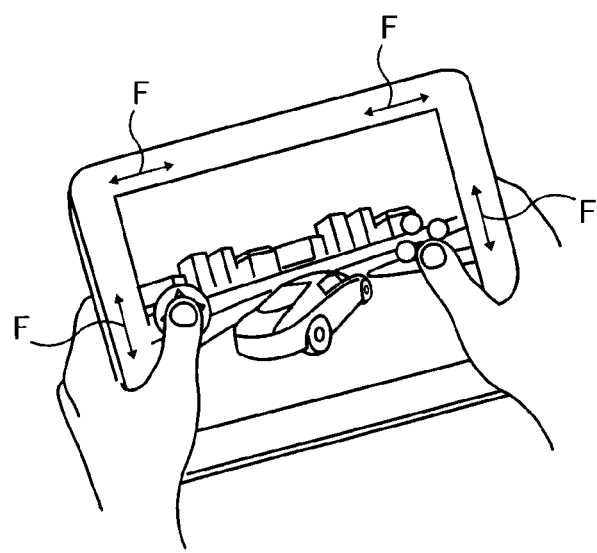

On the other hand, as illustrated in FIG. 8B, certain applications implemented on a touch screen may comprise a certain number of zones that are inactive to touch.

In the example illustrated in FIG. 8B, the application implemented uses virtual graphical objects of button and joystick type, positioned on predefined zones of the touch surface of the matrix touch sensor.

The position of these virtual graphical objects that are able to be manipulated by the user thus corresponds to zones of interest of the matrix touch sensor.

As illustrated by the arrows F, only a subset of rows and of columns, of which the intersections correspond to cells disposed facing virtual graphical objects, may be considered in the implementation of the method of acquiring data on the matrix touch sensor.

The invention claimed is:

1. A method of acquiring data from a matrix touch sensor including a matrix network of cells disposed in a set of rows and columns, the method comprising:

activating the cells disposed in a column of at least one subset of columns of the matrix touch sensor;

performing global measurement of a global electrical characteristic over all the rows of at least one subset of rows in the column of the matrix touch sensor;

performing, using processing circuitry, sequential measurement, only when the global electrical characteristic has a value representing a contact over at least one of the cells disposed in the column, of an electrical characteristic successively over each row of the at least one subset of rows in only the column where the global measurement is performed, the sequential measurement being performed by disconnecting all rows in the at least one subset of rows in the column from a measuring circuit, connecting a first row in the at least one subset of rows in the column to the measuring circuit, measuring an electrical signal, disconnecting the first row from the measuring circuit when the electrical signal is not measured, repeating the connecting and the disconnecting sequentially for each row in the at least one subset of rows in the column until the electrical signal is detected, and recording a location of a detected row in the at least one subset of rows in the column where the electrical signal is detected; and when the global electrical characteristic has no value representing a contact over any of the cells disposed in the column, without performing the sequential measurement for the rows in the column where the global measurement is performed, reiterating the performing global measurement and the performing sequential measurement after activating the cells disposed in another column of at least one subset of columns of the matrix touch sensor.

2. The method of acquiring data according to claim 1, further comprising performing a data acquisition standby mode when, after activation of the cells of all the columns of the at least one subset of columns, no global electrical characteristic measured has a value representing a contact, the data acquisition standby mode comprising:

activating the cells disposed in all the columns of at least one subset of columns of the matrix touch sensor; and performing global measurement of a global electrical characteristic over all the rows of the at least one subset of rows of the matrix touch sensor.

3. The method of acquiring data according to claim 2, wherein the data acquisition standby mode is suspended when a measured global electrical characteristic has a value representing a contact.

4. The method of acquiring data according to claim 1, wherein the electrical characteristic measured is a voltage, the global electrical characteristic being measured at terminals of the rows of the at least one subset of rows connected in parallel.

5. The method of acquiring data according to claim 1, wherein the subset of columns and the subset of rows of the matrix touch sensor correspond to a zone of interest of a touch surface of the matrix touch sensor.

6. The method of acquiring data according to claim 5, wherein
the matrix touch sensor is disposed adjacent to a display screen, and
the zone of interest corresponds to a zone for displaying a virtual graphical object on the display screen.

7. The method of acquiring data according to claim 1, further comprising:

storing coordinates in the matrix touch sensor corresponding to a location of an activated cell when an electrical characteristic having a value representing a contact is measured during the sequential measurement.

8. The method of acquiring data according to claim 1, wherein, when an application is implemented on the matrix touch sensor, the activating, the performing global measurement, and the performing sequential measurement are performed only with respect to the subset of columns and the subset of rows of the matrix touch sensor, the subset of columns excluding at least a part of the columns of the matrix touch sensor, the subset of rows excluding at least a part of the rows of the matrix touch sensor.

9. The method of acquiring data according to claim 8, wherein the subset of columns and the subset of rows of the matrix touch sensor correspond to zones of virtual graphical objects for user manipulation.

10. The method of acquiring data according to claim 1, wherein the global measurement is performed without sequentially scanning the rows of the at least one subset of rows in the column, the global measurement enabling detection of whether or not a contact is present at any rows of the subset of rows in the column without enabling detection of a row location of the contact.

11. A matrix touch sensor comprising:
a matrix network of cells disposed in a set of rows and columns;
a sensor interface; and
processing circuitry configured to
activate the cells disposed in a column of at least one subset of columns of the matrix touch sensor;
perform global measurement of a global electrical characteristic over all the rows of at least one subset of rows in the column of the matrix touch sensor;
perform sequential measurement, only when the global electrical characteristic has a value representing a contact over at least one of the cells disposed in the column, of an electrical characteristic successively over each row of the at least one subset of rows in the column where the global measurement is performed, the sequential measurement being performed by disconnecting all rows in the at least one subset of rows in the column from a measuring circuit, connecting a first row in the at least one subset of rows in the column to the measuring circuit, measuring an electrical signal, disconnecting the first row from the measuring circuit when the electrical signal is not measured, repeating the connecting and the disconnecting sequentially for each row in the at least one subset of rows in the column until the electrical signal is detected, and recording a location of a detected row in the at least one subset of rows in the column where the electrical signal is detected; and
when the global electrical characteristic has no value representing a contact over any of the cells disposed in the column, without performing the sequential measurement for the rows in the column where the global measurement is performed, reiterate the performing global measurement and the performing sequential measurement after activating the cells disposed in another column of at least one subset of columns of the matrix touch sensor.

12. The matrix touch sensor according to claim 11, wherein
the rows and columns are constituted by conductive tracks,
the cells are defined at an intersection of the conductive tracks, and
the measured electrical characteristic represents a level of impedance of each cell.

13. The matrix touch sensor according to claim 11, wherein the rows of at least one subset of rows of the matrix touch sensor are connected via the sensor interface to the processing circuitry.

14. A touch screen comprising:
a display screen; and
a matrix touch sensor including
a matrix network of cells disposed in a set of rows and columns;
a sensor interface; and
processing circuitry configured to
activate the cells disposed in a column of at least one subset of columns of the matrix touch sensor;
perform global measurement of a global electrical characteristic over all the rows of at least one subset of rows in the column of the matrix touch sensor;
perform sequential measurement, only when the global electrical characteristic has a value representing a contact over at least one of the cells disposed in the column, of an electrical characteristic successively over each row of the at least one subset of rows in the column where the global measurement is performed, the sequential measurement being performed by disconnecting all rows in the at least one subset of rows in the column from a measuring circuit, connecting a first row in the at least one subset of rows in the column to the measuring circuit, measuring an electrical signal, disconnecting the first row from the measuring circuit when the electrical signal is not measured, repeating the connecting and the disconnecting sequentially for each row in the at least one subset of rows in the column until the electrical signal is detected, and recording a location of a detected row in the at least one subset of rows in the column where the electrical signal is detected; and
when the global electrical characteristic has no value representing a contact over any of the cells disposed in the column, without performing the sequential measurement for the rows in the column where the global measurement is performed, reiterate the performing global measurement and the performing sequential measurement after activating the cells disposed in another column of at least one subset of columns of the matrix touch sensor, wherein
the display screen is adjacent to the matrix touch sensor.

* * * * *

UNITED STATES PATENT AND TRADEMARK OFFICE
CERTIFICATE OF CORRECTION

PATENT NO. : 9,535,532 B2
APPLICATION NO. : 14/352587
DATED : January 3, 2017
INVENTOR(S) : Julien Olivier et al.

Page 1 of 1

It is certified that error appears in the above-identified patent and that said Letters Patent is hereby corrected as shown below:

On the Title Page

Item (71), the Applicant's information has been listed incorrectly. Item (71) should read:
-- (71) Applicant: NISSHA PRINTING CO., Ltd.,
              Kyoto-shi (JP) --

Signed and Sealed this
Third Day of April, 2018

Andrei Iancu
*Director of the United States Patent and Trademark Office*